United States Patent [19]
Nishiyama

[11] Patent Number: 5,297,259
[45] Date of Patent: Mar. 22, 1994

[54] INFORMATION PROCESSING SYSTEM FOR TRANSMITTING INFORMATION FROM ONE APPARATUS TO ANOTHER

[75] Inventor: Masaki Nishiyama, Tokyo, Japan

[73] Assignee: Canon Kabushiki Kaisha, Tokyo, Japan

[21] Appl. No.: 902,790

[22] Filed: Jun. 24, 1992

Related U.S. Application Data

[63] Continuation of Ser. No. 403,778, Sep. 8, 1989, abandoned, which is a continuation of Ser. No. 694,238, Jan. 24, 1985, abandoned.

[30] Foreign Application Priority Data

Jan. 27, 1984 [JP] Japan .................. 59-12110

[51] Int. Cl.$^5$ .......................... G06F 3/02; G06F 7/02; G06F 9/06; G06F 13/376
[52] U.S. Cl. .................. 395/800; 364/229.5; 364/234; 364/234.2; 364/234.4; 364/234.3; 364/235; 364/235.6; 364/236; 364/238.2; 364/238.3; 364/238.6; 364/239.7; 364/239.8; 364/240.5; 364/240.7; 364/240.8; 364/240.9; 364/245.6; 364/255.7; 364/259.4; 364/265.1; 364/266.1; 364/284.3; 364/284.4; 364/DIG. 1; 364/DIG. 2
[58] Field of Search .............. 395/800, 775, 275, 200, 395/371, 375, 250, 425, 400, 500, 550, 600, 146, 147, 148, 700, 725; 364/419, DIG. 1, DIG. 2, 709.16, 709.15, 709.14, 709.12, 709.11, 419, 474.23; 400/109

[56] References Cited

U.S. PATENT DOCUMENTS 3,596,254 7/1971 Higleyman .................. 364/900
4,189,769 2/1980 Cook et al. .................. 364/200
4,193,112 3/1980 Gilbert .................. 364/200
4,193,113 3/1990 Cykowski .................. 364/200
4,200,913 4/9180 Kuhar et al. .................. 364/900
4,216,528 8/1980 Robertson .................. 364/200
4,398,264 8/1983 Couper et al. .................. 364/900
4,430,669 2/1984 Cheung .................. 380/20
4,480,305 10/1984 Watson et al. .................. 364/200
4,482,955 11/1984 Amano et al. .................. 364/200
4,538,225 8/1985 Banks .................. 364/200
4,555,773 11/1985 Karnes, Jr. et al. .................. 364/419
4,608,662 8/1986 Watanabe et al. .................. 395/146
4,625,276 11/1986 Benton et al. .................. 364/408
4,716,543 12/1987 Ogawa et al. .................. 395/275
4,735,515 4/1988 Ueda et al. .................. 400/109
4,910,697 3/1990 Lapeyke .................. 364/709.16
5,113,492 5/1992 Ariki et al. .................. 395/147

Primary Examiner—Alyssa H. Bowler
Assistant Examiner—Daniel H. Pan
Attorney, Agent, or Firm—Fitzpatrick, Cella, Harper & Scinto

[57] ABSTRACT

A changeover control unit of an information processing system transmits data to either one of at least two input buffers such as a printer buffer, key buffer and the like, the data being transmitted via a single signal line or functionally a single signal line connecting the at least two input buffers and the control section of the machine. The data includes a communication control data for controlling the control section and the buffers, or an information processing data from the key buffer. The change-over control unit judges the code of the data, decides whether the data is for a printer buffer, key buffer or the like, and changes over the receiving positions for the data.

12 Claims, 5 Drawing Sheets

FIG. 5

| UPPER / LOWER | 0 | 1 | 2 | 3 | 4 | 5 | 6 | 7 |
|---|---|---|---|---|---|---|---|---|
| 0 |  | DLE |  | 0 | @ | P | ` | p |
| 1 | SOH | DC1 | ! | 1 | A | Q | a | q |
| 2 | STX | DC2 | " | 2 | B | R | b | r |
| 3 | ETX | DC3 | # | 3 | C | S | c | s |
| 4 | EOT | DC4 | $ | 4 | D | T | d | t |
| 5 | ENQ | NAK | % | 5 | E | U | e | u |
| 6 | ACK | SYN | & | 6 | F | V | f | v |
| 7 | BEL | ETB | ' | 7 | G | W | g | w |
| 8 | BS | CAN | ( | 8 | H | X | h | x |
| 9 | HT | EM | ) | 9 | I | Y | i | y |
| A | LF | SUB | * | : | J | Z | j | z |
| B | HM | ESC | + | ; | K | [ | k | { |
| C | CL | — | , | < | L | ¥ | l | \| |
| D | CR | — | - | = | M | ] | m | } |
| E | SO | ↑ | . | > | N | ^ | n | ~ |
| F | SI | ↓ | / | ? | O | — | o | DEL |

INFORMATION PROCESSING SYSTEM FOR TRANSMITTING INFORMATION FROM ONE APPARATUS TO ANOTHER

This application is a continuation of application Ser. No. 07/403,778 filed Sep. 8, 1989 which is now abandoned, which is a continuation of application Ser. No. 06/694,238 filed Jan. 24, 1985, now abandoned.

BACKGROUND OF THE INVENTION

1. Field of the Invention

The present invention relates to an information processing system having a communication function, and more particularly relates to an information processing system having means for controlling communication using a key input device and a machine control character.

2. Description of the Prior Art

Functions of various machines have been improved with the advance of scientific technique, and in addition, at present, the development of machines which can communicate with each other via communication paths such as network, has occurred. For example, if typewriters have a communication function apart from its essential function, it is possible to use the key board as an input device and to use the printing unit as an output device. By so doing, typewriters could have a variety of applications such as to a Key board Send and Receive terminal, or KSR terminal for an information processing system or transmission system.

The processing capabilities of the printing unit of a typewriter, however, is poor so that the operation speed is extremely lowered if the communication speed is set so as not to bring about malfunction (missing character) even during "next line", "next page" processing or the like. In this case, if the host is arranged to automatically interrupt the transmission, the communication control becomes complicated. In view of the above, by setting the communication speed at the usual printing speed of a printing unit, in the event only when processings require much time such as when the printing unit is disabled to output a received data, a protocol (functional character), for example, X-ON (DC1)/X-OFF(DC2) or ENQ/ACK can be used for controlling communication. In synchronizing the processings, for example, in the X-ON/X-OFF control, as the KSR terminal (typewriter) sends out "X-OFF(DC2)", the transmission of data to the KSR terminal from the host is interrupted, and upon reception of "X-ON(DC1)", the transmission is resumed. Alternatively, in the ENQ/ACK control, with "ACK" not transmitted or "NAK" transmitted, a disabled condition of reception is indicated, or "ACK" is transmitted only when the reception is enabled. With the synchronizations as above, the degradation of the overall efficiency due to the operation requiring a long processing time as in "next line", "next page" or the like has been avoided. However, with the key board of a KSR terminal, a control code may be produced generally by depressing a character key while depressing another particular control key. For example, if the "Q" key is depressed while the "CONTROL" key on the key board is depressed, the same code $(11)_H$ as "X-ON(DC1)" is transmitted to the host. Thus, distinguishing from a control code "X-ON(DC1)" key for synchronizing control with the printing unit can not be performed, resulting in malfunction in the printing unit. Therefore, during the enabled condition of the printing unit, it has been impossible to input or transmit the above various control characters on the key board.

SUMMARY OF THE INVENTION

It is therefore in view of the above an object of the present invention to eliminate the above problems.

It is another object of the present invention to distinguish a character code from a communication control code.

It is a still further object of the present invention to provide an information processing system capable of inputting and transmitting a character code from a key board even during an enabled condition of a printing unit.

It is a further object of the present invention to form a code information related to communication basing upon a code information from a control code key and a code information from a character key.

It is another object of the present invention to make the input and output units of a machine independent from each other in an information processing system having a communication function.

It is a still further object of the present invention to provide an information processing system in which even while a KSR terminal of a machine outputs an information transmitted from another terminal to the output unit of the KSR terminal, there are no restrictions on the key input of key input means of the KSR terminal, and in which input processings completely independent from the output unit can be executed and the communication efficiency is not at all degraded.

It is a further object of the present invention to provide an output unit which can distribute data coming from the same signal line to more than two input buffers.

BRIEF DESCRIPTION OF THE DRAWINGS

FIG. 5 is a table showing a relation between ASCII codes and characters/symbols.

DETAILED DESCRIPTION OF THE PREFERRED EMBODIMENTS

The preferred embodiments of the present invention will now be described with reference to the accompanying drawings.

Figure 1:
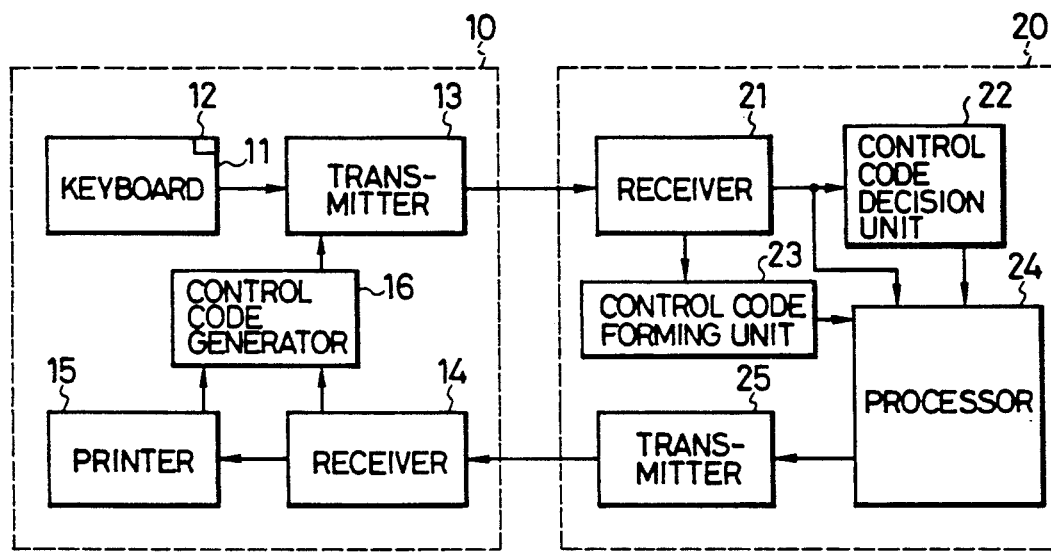
FIG. 1 is a block diagram showing an information processing system according to an embodiment of the present invention.

FIG. 1 is a block diagram showing an arrangement of an information processing system according to an embodiment of the present invention. A display for displaying the information may be provided in the system. The present invention relates to a change-over control for transmitting data to either one of at least two input buffers such as a printer buffer, key buffer and the like, the data being transmitted via a single signal line or functionally a single signal line connecting the input buffers and the control unit of the machine. The type of the system is not limited thereto, but it may be an integrated system. It is apparent further that the present invention may be applied to modified versions of the system.

Figure 2:
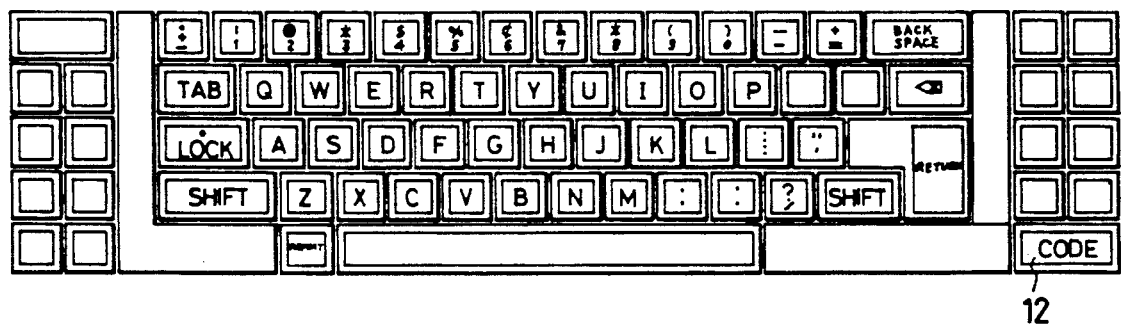
FIG. 2 is a front view of the key board of the KSR terminal included in the embodiment.

In the figure, reference number 10 denotes a typewriter serving as a KSR terminal, and reference number 11 denotes a key board section the detail of which is shown in FIG. 2. As shown in FIG. 2, the key board section 11 has a particular key 12 (CODE key). Reference number 13 denotes a transmitter for transmitting the input data from the key board section 11 to a host or other terminals 20 (generally referred to as a host hereinafter), reference number 14 denotes a receiver for receiving the data from the host 20, reference number 15 denotes a printer for printing out the data received by the receiver 14, and reference number 16 denotes a control code generator. The control code generator 16 conducts to the transmitter 13 an X·OFF (DC1) code requesting the interruption of delivery of the data from the host 20 if the data received by the receiver 14 can not be output to the printer, while, on the other hand the control code generator 16 conducts also to the transmitter 13 an X·ON (DC2) code requesting the resumption of delivery of the data from the host 20 if the delivery to the printer is enabled.

Reference number 20 denotes the host or other terminals for processing the data from the KSR terminal 10 and outputting the processed data. The host 20 includes a receiver 21 for receiving the data from the KSR terminal 10, a control code decision unit for discriminating a control code from among the data received by the receiver 21, the decision unit here having a reference code, #40 and #1F, a control code forming unit 23 for forming a control code based upon the received data, a processor 24, and a transmitter 25 for receiving the data from the processor 24 and transmitting the processed data to the KSR terminal 10.

Figure 3:
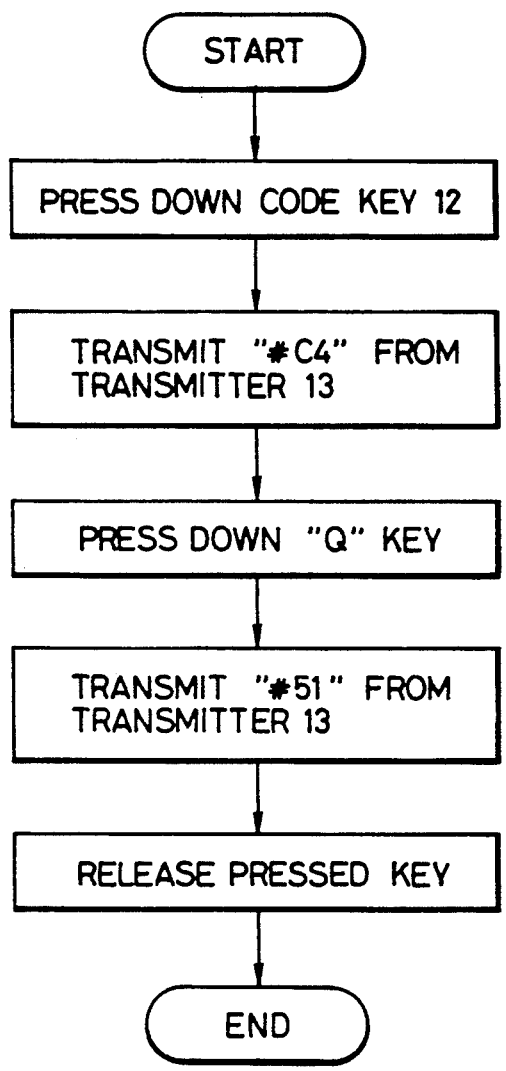
FIG. 3 is a flow chart showing an example of transmission processings using the key inputs of the KSR terminal of the system according to the embodiment.

The KSR terminal 10 does not generate a control code (corresponding to a functional character as in JIS-C6220) upon reception of an input from the key board section 11, but it generates upon reception of an input from the depressed particular key 12 (CODE key) a character code such as "#C4" corresponding to the depressed key, and succeedingly upon depression of a figure character key such as "Q key", a character code "#51" corresponding to the "Q" key is output. In FIG. 3, the above described control sequence flow chart is shown.

Conventionally, the depression of the particular key 12 (CODE key) has caused no output, but the depressions of the particular key 12 (CODE key) simultaneously with the "Q" key has caused an output "#11" of the code of a machine control character serving as a functional character.

It is noted here that the depressions of such a CODE key and "Q" key are intended for performing functions such as editing the document data on the display. The CODE key and "Q" key executes a quick menu. For example, the CODE key and "Q" and "R" keys moves the cursor to the head of the document. The CODE key and "Q" and "C" keys moves the cursor to the end of the document. The CODE key and "K" executes a block menu which upon designation of a block copies the document within the designated block to the position beginning at the cursor position.

In the host 20 of the present embodiment, the control code decision unit 22 discriminates a control code generated by the control code generator 16 of the KSR terminal 10 through the receiver 21 of the host 20, and notifies the processor 24 of the discriminated results to control the transmission by the transmitter 25. In addition, the control code forming unit 23 monitors the "#C4" code from the KSR terminal initiated by the depression of the particular key 12, and forms a character code not of a common character but with a function, based upon the "#C4" code and the succeeding character code, so as to output it to the processor 24 as a control code.

Figure 4:
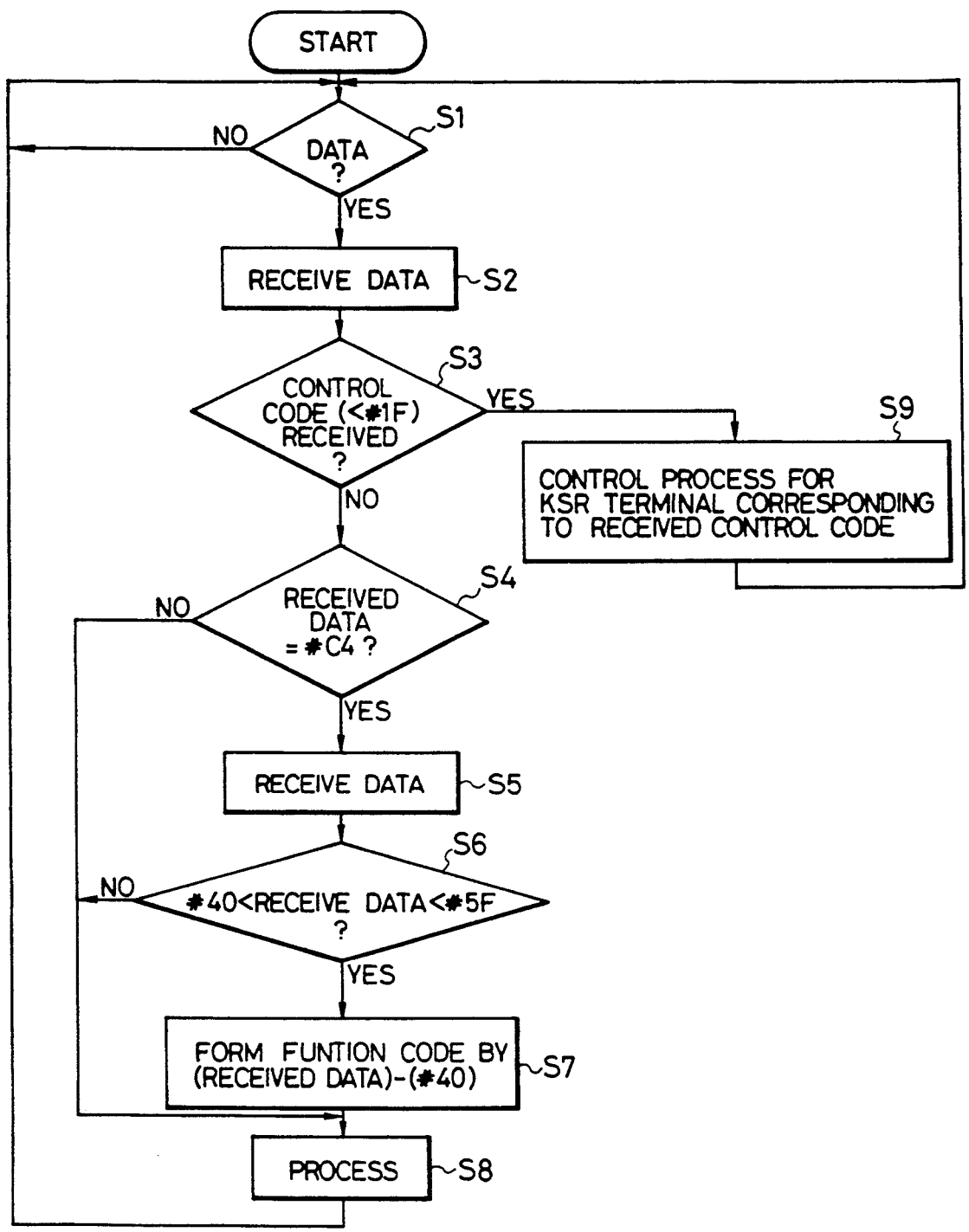
FIG. 4 is a flow chart explaining reception processings in the host-side of the system according to the embodiment.

The control of data reception by the host 20 will now be described in detail with reference to the flow chart shown in FIG. 4. It is here assumed that codes #00 to #1F are control codes and codes #40 to #5F are character codes such as A, B, ...Z, "[", "¥", " ^ ". FIG. 5 is a table showing a correspondence between ASCII codes and characters/symbols. In FIG. 4, first at step S1 the host 20 waits for reception of data from the KSR terminal 10. Upon reception of data, step S2 follows. At step S3 the control code decision unit 22 discriminates as to whether the values of the received data include any one of the control codes of "#1F" and so on (refer to FIG. 5) or not. In the event that it is a control code, that is, #1F > received data, then step S9 follows to effect a control of the KSR terminal in accordance with the received control code. In the embodiment, if the received code is "#11", that is, DC1(X OFF), the data transmission from the transmitter 25 is interrupted, while on the other hand if the received code is "#12", that is, DC2(X·ON), the data transmission from the transmitter 25 is resumed.

In the event that at step S3 if the received code is decided not to be a control code (functional code), that is, not to be received code <1F(refer to FIG. 5), then step S4 follows where the received code is checked whether it is the code representative of the CODE key 12 of the KSR terminal, that is, "#C4". The presence of "#C4" means that the CODE key 12 has been depressed. In this case, it is necessary to form a control code basing upon the succeeding received code without recognizing it as a mere character code. Thus, at step S5 the succeeding data is received and at step S6 the received data is checked whether it is any one of the character codes from "#40" to "#5F" (refer to FIG. 5, A to Z correspond to "41H" to "5A"). This is because that in order for the KSR terminal to receive a control (functional) code, the system has been so set to request the depressions of both the CODE key 12 and any one of the character keys representative of the character codes of "#40 to #5F". If the depressed code is one among the character codes "#40 to #5F", at step S7 the control code forming unit 23 processes the data received at step S5 to effect (received data) −(#40). Thus, a control (functional) code is formed which is not the original character code but the character code of {(received data) −(#40)}. The new code is of the type that if for example the received data is #51 representative of "Q", the code is #11 obtained through the process of #51 −#40. It is noted that the code indicates the above mentioned "quick menu" and is not a communication control code. Thereafter, at step S8 the newly formed code is used as a received data, and a process such as "quick menu" is executed and returns to Step 1.

If the received data at step S4 is not "#C4" indicative of the depression of the CODE key 12 of the KSR terminal, and also if the received data at step S6 is other than any one of "#40 to 5F", then step S8 follows where the received data are processed as they are the received data from the KSR terminal. For instance, if the received data is "#62", then as seen from FIG. 5 the data is considered as a character "b" and it is processed as it is.

As described above, according to the present invention, there are no restrictions on the key inputs by the key input means even while the data are being output to the output unit of the KSR terminal. Therefore, it is possible to provide an information processing system in which input processings are completely independent from the output unit, and moreover communication efficiency is not at all degraded. In the embodiment described above, the control (functional) code (<#1F) has not been generated as an input data from the key board 11, but the control (functional) code has been generated by forming a particular code (#C4) through the depression of the particular key (CODE key) 12 and by processing at the host the particular code and the succeedingly input common character code. Thus, the confusion with control codes for use with such a communication control or KSR terminal control has been avoided. However, the same operation and effect may be achieved using another method: The control code generator 16 instead of the key board generates a particular code and the succeeding character code both of which are used as a control code for controlling such as communication or KSR terminal. Thus, the input from the particular key of the key board 10 of the KSR terminal does not deliver a code corresponding to the particular key to the host 20, but a combination of the particular key plug character key generated by the control code generator can only be applied to the host 20 for the control purpose. The method will further be described with reference to FIG. 6.

In summary, in the embodiment shown with FIG. 4, the codes generated two times with the key inputs having no concern with the printer are transmitted to the host to avoid the confusion. While on the other hand, in the embodiment shown in FIG. 6, the control codes for the printer having no concern with the keyboard are transmitted two times to the host to avoid the confusion. The formation of codes with the key inputs can be attained is as well known in the art.

Figure 6:
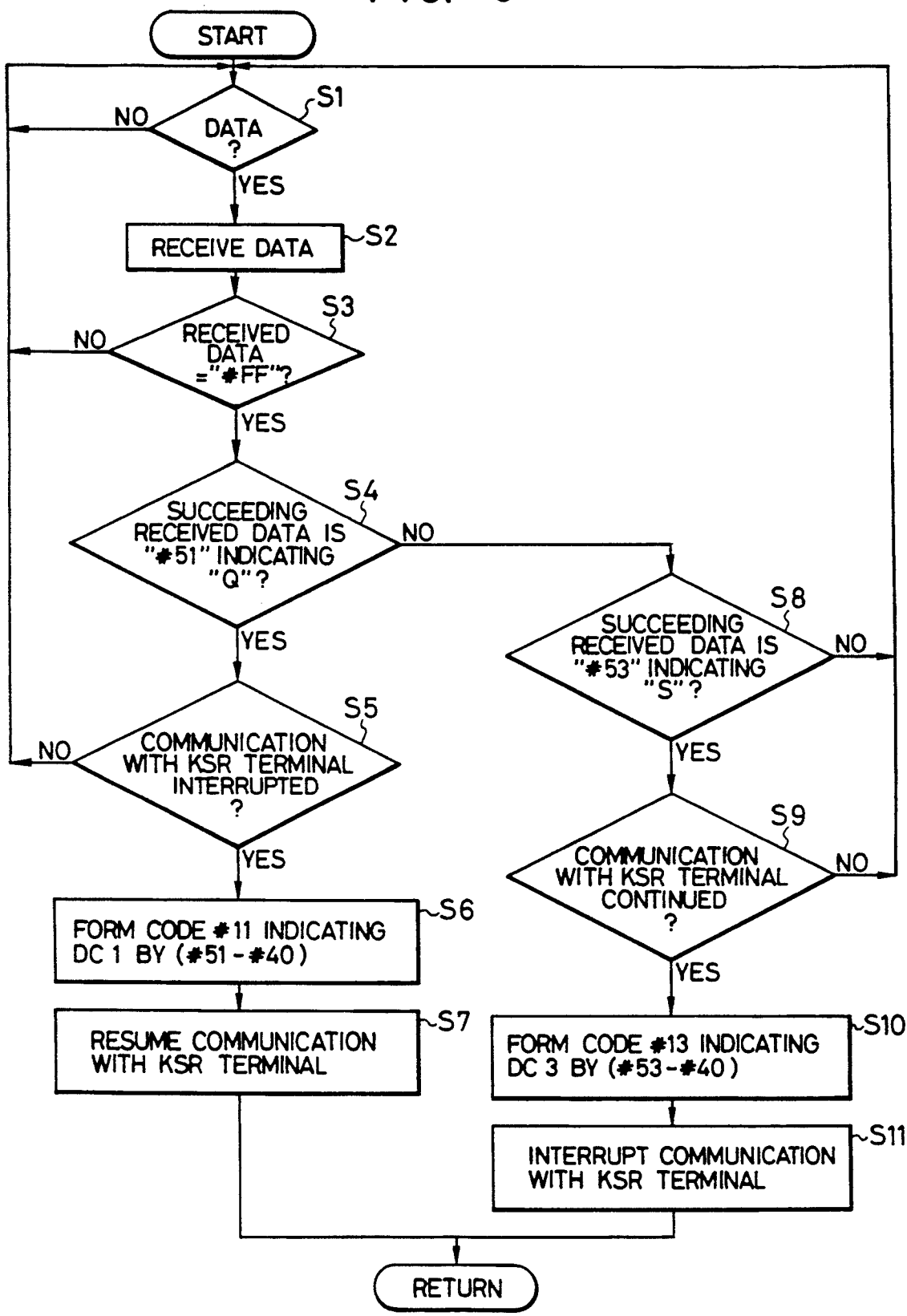
FIG. 6 is a flow chart for explaining the reception processings according to another embodiment of the present invention.

FIG. 6 is a flow chart showing the method of avoiding the confusion with the codes from the key board by transmitting two series of communication control codes from the control code generator 16.

At the side of the host, first at step S1 a judgement whether any received data is present or not is made. If there is a receiving data, the data is received at step S2. At step S3 it is decided whether the received data is a code "#FF" which is not usually used. If the code "#FF" is received, then steps S4 and succeeding steps follow in order to decide the communication control basing upon the succeedingly received code of either DC1 indicative of communication resumption or DC3 indicative of interruption. In the present embodiment, only the codes DC1 and DC3 among various codes for communication control have been described for the purpose of simplicity of description. At step S4 it is judged whether a received data following "#FF" is "#51" or not. If the judgment is affirmative, then at step S5 it is decided whether the communication with the KSR terminal is being interrupted at that time or not, and if the judgment is negative, then the process returns to step S1, while if it is affirmative, then at step S6 the control code is formed. The control, code is for indicating the resumption of communication after the interruption of communication, which is executed at step S7 and thereafter the process returns. If at step S4 the judgment is negative, then step S8 follows to judge whether the received data is "#53" or not. If the judgment is negative or is a judgement that a communication control code has not been received, the process returns to step S1, while if affirmative, then at step S9 it is judged whether the communication with the KSR terminal is now going on or not. If the communication is going on, at step S10 a control code #13 is formed, which represents DC3 as seen from FIG. 5 and indicates the interruption of communication with the KSR terminal. At step S11 the interruption of communication with the KSR terminal is executed. In generating the control code and interrupting the communication, if the data to be output to the printer exceeds more than a preset amount, the code is generated at the side of the printer of the KSR terminal so that a smooth output of the data and communication can be ensured.

I claim:
1. An information processing system for transmitting information between first and second apparatuses, wherein said first apparatus comprises:
processing means for processing code information of a first kind;
first transmission means for transmitting information to said second apparatus;
first control means for controlling said first transmission means according to code information of the first kind;
first receiving means for receiving code information of the first kind and a code information of second kin via a same transmission path;
discrimination means for discriminating between the code information of the first kind and the code information of the second kind received by said first receiving means;
converting means for converting the code information of the second kind discriminated by said discrimination means to the code information of the first kind and outputting the converted code information to said first control means; and
second control means for controlling said processing means to process the code information of the first kind discriminated by said discrimination means,
wherein said second apparatus comprises:
key input means for inputting code information of the first kind;
second receiving means for receiving information from said first apparatus;
generation mean for generating code information of the second kind for controlling said second apparatus in response to the transmitting of information to said second receiving means by said first apparatus; and
second transmission means for transmitting the code information of the first kind input by said key input means and the code information of the second kind generated by said generation means to said first apparatus via the same transmission path.

2. An apparatus according to claim 1, wherein the code information of the second kind includes a specific code indicating that the code information is the code information of the second kind.

3. An apparatus according to claim 1, wherein said discriminating means includes means for detecting a specific code indicating that the code information is the code information of the second kind.

4. An information processing apparatus comprising:
processing means for processing code information of a first kind;
first transmission means for transmitting information to a partner apparatus;
first control means for controlling said transmission means according to code information of the first kind;
receiving means for receiving code information of the first kind and code information of a second kind via a same transmission path;
discriminating means for discriminating between the code information of the first kind and the code information of the second kind received by said receiving means;
converting means for converting the code information of the second kind discriminated by said discrimination means to the code information of the first kind and outputting the converted code information to said first control means; and
second control means for controlling said processing means to process the code information of the first kind discriminated by said discrimination means.

5. An apparatus according to claim 4, wherein the code information of the second kind includes a specific code indicating that the code information is the code information of the second kind.

6. An apparatus according to claim 4, wherein said discriminating means includes means for detecting a specific code indicating that the code information is the code information of the second kind.

7. An information processing system for transmitting information between first and second apparatuses,
wherein said first apparatus comprises:
processing means for processing code information of a first kind;
first transmission means for transmitting information to said second apparatus;
first control means for controlling said first transmission means according to code information of the first kind;
first receiving means for receiving code information of the first kind and code information of a second kind via a same transmission path;
discrimination means for discriminating between the code information of the first kind and the code information of the second kind received by said first receiving means;
converting means for converting the code information of the second kind discriminated by said discrimination means to the code information of the first kind and outputting the converted code information to said processing means; and
second control means for controlling said first control means to perform a control operation according to the code information of the first kind discriminated by said discrimination means,
wherein said second apparatus comprises:
key input means for inputting code information of the second kind;
second receiving means for receiving information from said first apparatus;
generation means for generating code information of the first kind for controlling said second apparatus in response to the transmitting of information to said second receiving means by said first apparatus; and
second transmission means for transmitting the code information of the second kind input by said key input means and the code information of the first kind generated by said generation means to said first apparatus via the same transmission path.

8. An apparatus according to claim 7, wherein the code information of the second kind includes a specific code indicating that the code information is the code information of the second kind.

9. An apparatus according to claim 7, wherein said discriminating means includes means for detecting a specific code indicating that the code information is the code information of the second kind.

10. An information processing apparatus comprising:
processing means for processing code information of a first kind;
transmission means for transmitting infmraiotn to a partner apparatus;
first control means for controlling said transmission means according to code information of the first kind;
receiving means for receiving code information of the first kind and code information of a second kind via a same transmission path;
discrimination means for discriminating between the code information of the first kind and the code information of the second kind received by said receiving means;
converting means for converting the code information of the second kind discriminated by said discrimination means to the code information of the first kind and outputting the converted code information to said processing means; and
second control means for controlling said first control means to perform a control operation according to the code information of the first kind discriminated by said discrimination means.

11. An apparatus according to claim 10, wherein the code information of the second kind includes a specific code indicating that the code information is the code information of the second kind.

12. An apparatus according to claim 10, wherein said discriminating means includes means for detecting a specific code indicating that the code information is the code information of the second kind.

* * * * *

UNITED STATES PATENT AND TRADEMARK OFFICE
CERTIFICATE OF CORRECTION

PATENT NO. : 5,297,259
DATED : March 22, 1994
INVENTOR(S) : MASAKI NISHIYAMA

It is certified that error appears in the above-indentified patent and that said Letters Patent is hereby corrected as shown below:

COVER PAGE
At [56] References Cited, "4,910,697 3/1990 Lapeyke" should read --4,910,697 3/1990 Lapeyre--.

ON SHEET 3 OF THE DRAWINGS
Fig. 4, Step S7, "FUNTION" should read --FUNCTION--.

COLUMN 1
Line 25, "its" should read --their--.

COLUMN 3
Line 61, "executes" should read --execute--.
Line 62, "moves" should read --move--.
Line 64, "moves" should read --move--.
Line 65, ""K" executes" should read --"K" key execute--.

COLUMN 4
Line 32, "hand" should read --hand,--.

COLUMN 5
Line 34, "plug" should read --plus--.

COLUMN 6
Line 2, "control," (2nd occurrence) should read --control--.
Line 35, "a" should be deleted; and, "of" (second occurrence) should read --of a--.
Line 36, "kin" should read --kind--.
Line 56, "mean" should read --means--.

UNITED STATES PATENT AND TRADEMARK OFFICE
CERTIFICATE OF CORRECTION

PATENT NO. : 5,297,259
DATED : March 22, 1994
INVENTOR(S) : MASAKI NISHIYAMA

It is certified that error appears in the above-indentified patent and that said Letters Patent is hereby corrected as shown below:

COLUMN 7
    Line 10, "first" should be deleted.

COLUMN 8
    Line 32, "infmraiotn" should read --information--.

Signed and Sealed this

Eleventh Day of October, 1994

Attest:

BRUCE LEHMAN

*Attesting Officer*      *Commissioner of Patents and Trademarks*